United States Patent
Uchiyama

(10) Patent No.: US 9,623,596 B2
(45) Date of Patent: Apr. 18, 2017

(54) INJECTION MOLDING SYSTEM

(71) Applicant: FANUC Corporation, Yamanashi (JP)

(72) Inventor: Tatsuhiro Uchiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 18 days.

(21) Appl. No.: 14/867,724

(22) Filed: Sep. 28, 2015

(65) Prior Publication Data

US 2016/0096298 A1    Apr. 7, 2016

(30) Foreign Application Priority Data

Oct. 7, 2014   (JP) .................................. 2014-206512

(51) Int. Cl.
B29C 45/17     (2006.01)
B07C 5/342     (2006.01)
B29C 45/76     (2006.01)

(52) U.S. Cl.
CPC .......... *B29C 45/1769* (2013.01); *B07C 5/342* (2013.01); *B29C 45/7686* (2013.01); *B29C 2045/1772* (2013.01); *B29C 2945/76464* (2013.01)

(58) Field of Classification Search
CPC ........ B29C 2045/1772; B29C 45/1769; B29C 45/7686
See application file for complete search history.

(56) References Cited

U.S. PATENT DOCUMENTS

| 5,392,928 A * | 2/1995 | Nickey ................. B07C 5/3404 198/460.1 |
| 5,912,028 A * | 6/1999 | Airas .................. B29C 45/1769 264/334 |
| 8,827,674 B1 * | 9/2014 | Duffey ................ B29C 45/0084 425/457 |
| 2005/0156343 A1 * | 7/2005 | Cochran ............. B29C 45/7686 264/40.1 |
| 2013/0277885 A1 | 10/2013 | Nagami |

FOREIGN PATENT DOCUMENTS

| JP | H04-330976 A | 11/1992 |
| JP | 2001-88186 A | 4/2001 |
| JP | 2009-105257 A | 5/2009 |
| JP | 4887467 B1 | 2/2012 |
| JP | 2014-156096 A | 8/2014 |

OTHER PUBLICATIONS

Decision to Grant a Patent in JP Application No. 2014-206512, mailed Dec. 8, 2015.

* cited by examiner

*Primary Examiner* — Jill Heitbrink
(74) *Attorney, Agent, or Firm* — Hauptman Ham, LLP

(57) ABSTRACT

Types of molded articles carried by a carrier are identified and the molded articles are sorted based on image-related information for the molded articles molded based on set operating conditions for injection molding machines and molded article images acquired by an image acquisition unit. It is thus possible to narrow down candidate images in processing in a molded article identification unit, thereby making it possible to construct an injection molding system that has excellent production efficiency with a reduced load on processing in the molded article identification unit.

7 Claims, 2 Drawing Sheets

INJECTION MOLDING SYSTEM

RELATED APPLICATIONS

The present application claims priority to Japanese Application Number 2014-206512, filed Oct. 7, 2014, the disclosure of which is hereby incorporated by reference herein in its entirety.

BACKGROUND OF THE INVENTION

1. Field of the Invention

The present invention relates to an injection molding system and more particularly to an injection molding system that includes a mechanism for sorting molded articles from a plurality of injection molding machines.

2. Description of the Related Art

In an injection molding factory, when work such as box packing or alignment of molded articles molded by injection molding machines is performed, such work is usually performed in each injection molding machines using a robot or the like. However, when a robot or the like is provided for each injection molding machine, equipment or maintenance costs may be high or large installation space may be required.

To reduce costs or installation space, Japanese Patent Application Laid-Open No. 4-330976 discloses a technique by which, in an injection molding machine physical distribution system in which a plurality of injection molding machines are arranged, articles taken out of the plurality of injection molding machines are carried by a single conveyor, and the articles taken out of the respective injection molding machines are determined by a shape recognition device, a weight-based determination device, and a temperature measurement device.

In the technique disclosed in Japanese Patent Application Laid-Open No. 4-330976 above, the shape recognition device is used to make a determination by differences in shape, but reference shape data is not sent to the shape recognition device. Therefore, the shape recognition device needs to make a determination among candidate images of all types of molded articles that may be carried, and a large load may be imposed on processing in the shape recognition device. To reduce an amount of processing in the shape recognition device, it could be considered that the shape recognition device recognizes the shape of an actual molded article and creates reference shape data each time a molded article type is changed. However, there would be another problem in that the creation of shape data must be conducted frequently and is troublesome, especially in high-mix, low-volume production.

SUMMARY OF THE INVENTION

An object of the present invention is to provide an injection molding system that includes a mechanism for sorting molded articles from a plurality of injection molding machines, and has enhanced production efficiency with a reduced load on processing in a device that sorts the molded articles, in order to solve the above problem.

An injection molding system according to the present invention includes: a plurality of injection molding machines that produce molded articles based on preset operating conditions; a carrier that carries the molded articles; a storage section that stores, for each molded article type, a set of the operating conditions for the injection molding machines and image-related information for the molded articles that are associated with the operating conditions and are molded in accordance with the operating conditions; and a molded article sorting section that sorts the molded articles. The molded article sorting section includes: an image acquisition unit that acquires images of the molded articles carried by the carrier; a molded article identification unit that generates identification information for identifying types of the molded articles carried by the carrier in accordance with the molded article images acquired by the image acquisition unit and the image-related information for the molded articles stored in the storage section; and a molded article sorting unit that sorts the carried molded articles based on the identification information generated by the molded article identification unit.

In the injection molding system according to the present invention, a set of the operating conditions for the injection molding machines and the image-related information for the molded articles that are associated with the operating conditions and are molded in accordance with the operating conditions is stored in the storage section, the types of the carried molded articles are identified in accordance with the molded article images acquired by the image acquisition unit and the image-related information for the molded articles stored in the storage section, and the molded articles are sorted. Because the image-related information for the molded articles associated with the operating conditions prestored in the storage section can be used for a comparison with the molded article images acquired by the image acquisition unit, it is possible to narrow down candidate images in processing in the molded article identification unit. This makes it possible to construct an injection molding system that has excellent production efficiency with a reduced load on processing in the molded article identification unit. Further, because the image-related information for the molded articles can be set in the molded article identification unit in conjunction with setting of the operating conditions, it is possible for an operator to reduce time and effort during operations and mistakes during the setting. As the image-related information for the molded articles in the present invention, molded article image information itself, image information identifiers, or other information related to molded article images may be used.

The storage section may be disposed in each of the injection molding machines. The injection molding machine may include a setting section that sets the operating conditions. The storage section may store, as the image-related information, the image information for the molded articles that are molded in accordance with the operating conditions. The image information for the molded articles associated with the operating conditions set by the setting section may be set in the molded article identification unit.

In this embodiment, each injection molding machine includes the storage section that stores the image information for the molded articles that are molded in accordance with the operating conditions, and the image information for the molded articles associated with the operating conditions is set in the molded article identification unit, thereby making it possible to narrow down candidate images in processing in the molded article identification unit. Therefore, even when a molded article type is changed, sorting appropriate to the molded article types can be performed immediately. It is thus possible to construct an injection molding system that has excellent production efficiency with a reduced load on processing in the molded article identification unit.

Further, because the image-related information for the molded articles can be set in the molded article identification unit in conjunction with setting of the operating conditions, it is possible for an operator to reduce time and effort during operations and mistakes during the setting.

The injection molding system may further include a central control device that centrally manages the injection molding machines and the molded article identification unit. The central control device may include a setting section that sets the operating conditions in one of the injection molding machines. The storage section may be disposed in the central control device. The storage section may store, as the image-related information, the image information for the molded articles that are molded in accordance with the operating conditions. The image information for the molded articles associated with the operating conditions set by the setting section may be set in the molded article identification unit.

In this embodiment, the central control device includes the storage section that stores the image information for the molded articles that are molded in accordance with the operating conditions, and the image information for the molded articles associated with the operating conditions is set in the molded article identification unit, thereby making it possible to narrow down candidate images in processing in the molded article identification unit. Even when a molded article type is changed, sorting appropriate to the molded article types can be performed immediately. It is thus possible to construct an injection molding system that has excellent production efficiency with a reduced load on processing in the molded article identification unit. Further, because the image-related information for the molded articles can be set in the molded article identification unit in conjunction with setting of the operating conditions, it is possible for an operator to reduce time and effort during operations and mistakes during the setting.

The storage section may be disposed in each of the injection molding machines. The injection molding machine may include a setting section that sets the operating conditions. The storage section may store, as the image-related information, identifiers of the molded articles that are molded in accordance with the operating conditions. The molded article sorting section may further include an image information storage section that stores molded article image information associated with the identifiers. The molded articles may be identified based on the molded article image information that is stored in the image information storage section and is associated with the identifiers of the molded articles that are molded in accordance with the operating conditions set by the setting section and the molded article images acquired by the image acquisition unit.

In this embodiment, each injection molding machine includes the storage section that stores the identifiers of the molded articles that are molded in accordance with the operating conditions, and the molded article identification unit includes the image information storage section that stores the molded article image information associated with the identifiers. The molded articles are identified based on the molded article image information associated with the identifiers of the molded articles associated with the operating conditions and the molded article images acquired by the image acquisition unit. It is thereby possible to narrow down candidate images in processing in the molded article identification unit. Even when a molded article type is changed, sorting appropriate to the molded article types can be performed immediately. It is thus possible to construct an injection molding system that has excellent production efficiency with a reduced load on processing in the molded article identification unit. Because information transmitted and received via communication lines that link the injection molding machines and the molded article identification unit is limited to identifiers, there is no need to transmit image information, which often has a large volume, through the communication line, and a load on the communication line can be reduced. Further, because the image-related information for the molded articles can be set in the molded article identification unit in conjunction with setting of the operating conditions, it is possible for an operator to reduce time and effort during operations and mistakes during the setting.

The injection molding system may further include a central control device that centrally manages the injection molding machines and the molded article identification unit. The central control device may include a setting section that sets the operating conditions in one of the injection molding machines. The storage section may be disposed in the central control device. The storage section may store, as the image-related information, the identifiers of the molded articles that are molded in accordance with the operating conditions. The molded article sorting section may further include an image information storage section that stores the molded article image information associated with the identifiers. The molded articles may be identified based on the molded article image information that is stored in the image information storage section and is associated with the identifiers of the molded articles that are molded in accordance with the operating conditions set by the setting section and the molded article images acquired by the image acquisition unit.

In this embodiment, the central control device includes the storage section that stores the identifiers of the molded articles that are molded in accordance with the operating conditions, and the molded article identification unit includes the image information storage section that stores the molded article image information associated with the identifiers. The molded articles are identified based on the molded article image information associated with the identifiers of the molded articles associated with the operating conditions and the molded article images acquired by the image acquisition unit. It is thereby possible to narrow down candidate images in processing in the molded article identification unit. Even when a molded article type is changed, sorting appropriate to the molded article types can be performed immediately. It is thus possible to construct an injection molding system that has excellent production efficiency with a reduced load on processing in the molded article identification unit. Because information transmitted and received via a communication lines that link the injection molding machines, the central control device, and the molded article identification unit is limited to identifiers, there is no need to transmit image information, which often has a large volume, through the communication line, and a load on the communication line can be reduced. Further, because the image-related information for the molded articles can be set in the molded article identification unit in conjunction with setting of the operating conditions, it is possible for an operator to reduce time and effort during operations and mistakes during the setting.

Either the molded article identification unit or the molded article sorting unit may include a counting section that counts a quantity of molded articles for each of the types of the sorted molded articles. When the quantity of the molded articles counted by the counting section reaches a preset quantity, a preset instruction may be output to the injection molding machine that produces the molded articles. The preset instruction may be at least one of an operation stop instruction, a warning output instruction, and an instruction for displaying a warning message on a screen.

In this embodiment, the counting section that counts a quantity of molded articles for each of the types of the sorted molded articles is provided. When the counted quantity of the molded articles reaches a preset quantity, a preset instruction such as an operation stop instruction, a warning output instruction, or an instruction for displaying a warning message on a screen is output to any of the injection molding machines. Thus, the injection molding machines do not produce a quantity of molded articles more than necessary.

The present invention has the above configurations and can therefore provide an injection molding system that includes a mechanism for sorting molded articles from a plurality of injection molding machines, and has enhanced production efficiency with a reduced load on processing in a device that sorts the molded articles.

BRIEF DESCRIPTION OF THE DRAWINGS

The above and other objects and features of the present invention will be apparent from the following description of embodiments with reference to the appended drawings, in which.

DETAILED DESCRIPTION OF THE PREFERRED EMBODIMENTS

An injection molding system according to a first embodiment of the present invention will now be described with reference to FIGS. 1 and 2.

Figure 1:
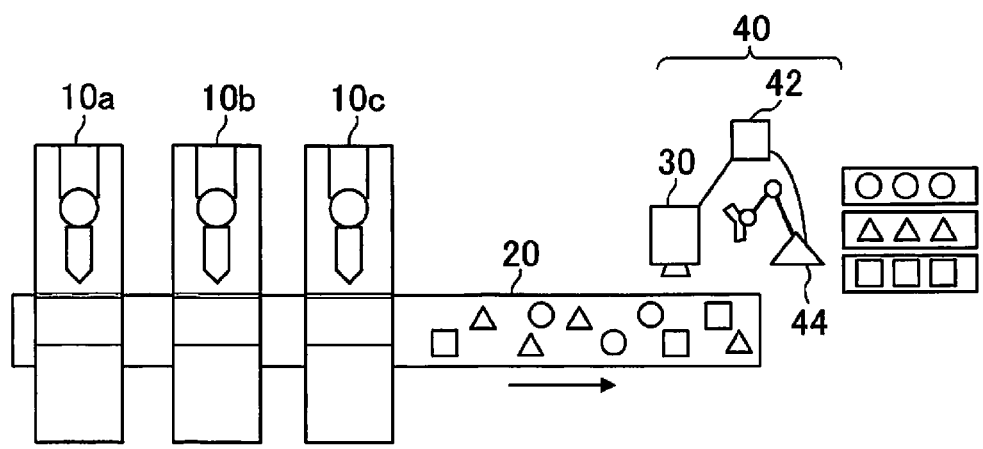
FIG. 1 is a configuration diagram of an injection molding system according to a first embodiment of the present invention.

As illustrated in FIG. 1, the injection molding system includes three injection molding machines 10a, 10b, and 10c arranged in parallel. Molded articles (not shown) produced by these injection molding machines 10a, 10b, and 10c are carried by a carrier 20, and images of the molded articles carried by the carrier 20 are acquired by an image acquisition unit 30.

The images of the molded articles acquired by the image acquisition unit 30 are input to a molded article identification unit 42. The molded article identification unit 42 is connected to the injection molding machines 10a, 10b, and 10c, and molded article image information stored in the injection molding machines 10a, 10b, and 10c is input to the molded article identification unit 42. As the molded article image information that is stored in the injection molding machines 10a, 10b, and 10c and is input to the molded article identification unit 42, images generated by taking images of actually molded articles with an image acquisition unit such as a camera or images converted from models created based on drawings of molded articles may be used. The drawings or the models of the molded articles may be planar and two-dimensional or stereoscopic and three-dimensional. The image information may be monochrome or color with color information added. When the color image information is used, it is possible to identify molded articles that have the same shape and different colors.

The molded articles carried by the carrier 20 are identified and sorted, and then packed in boxes or aligned by the molded article sorting unit 44. As the molded article sorting unit 44, an articulated robot or a parallel link robot may be used. When the parallel link robot is used, it is possible to more efficiently sort a large number of molded articles and pack the molded article in boxes or align them. The image acquisition unit 30, the molded article identification unit 42, and the molded article sorting unit 44 are interconnected via a communication line or the like, and acquired images or identification information can be mutually input and output.

Figure 2:
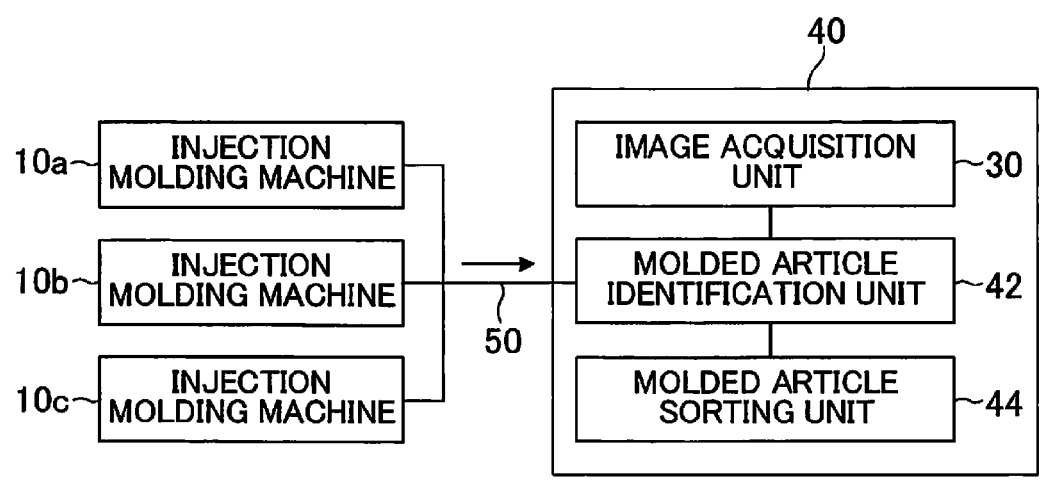
FIG. 2 is a block diagram of the injection molding system in FIG. 1.

As illustrated in FIG. 2, the injection molding machines 10a, 10b, and 10c are connected to the molded article identification unit 42 via a communication line 50, and molded article image information stored in the injection molding machines 10a, 10b, and 10c is input to the molded article identification unit 42 through the communication line 50. The image acquisition unit 30 and the molded article identification unit 42 are also connected, and the molded article identification unit 42 and the molded article sorting unit 44 are also connected, via the communication line 50. The image acquisition unit 30, the molded article identification unit 42, and the molded article sorting unit 44 constitute a molded article sorting section 40.

Operation of the injection molding system illustrated in FIG. 2 will next be described.

The injection molding machines 10a, 10b, and 10c transmit image information for articles that should be molded to the molded article identification unit 42 through the communication line 50 each time a type of a molded article to be produced is changed. The molded article identification unit 42 stores the transmitted molded article image information in an internal molded article image information storage section (not shown).

When molded articles are carried from the injection molding machines 10a, 10b, and 10c by the carrier 20, the image acquisition unit 30 takes images of the carried molded articles and transmits imaging data to the molded article identification unit 42. The molded article identification unit 42 determines types of the molded articles carried by the carrier 20 based on molded article image information that is transmitted in advance from the injection molding machines and molded article image data transmitted from the image acquisition unit 30, and transmits molded article type information to the molded article sorting unit 44. The molded article sorting unit 44 sorts the molded articles based on the transmitted molded article type information.

When such an injection molding system that includes a plurality of injection molding machines is constructed, there is no need to provide a set of an image acquisition unit, a molded article identification unit, and a molded article sorting unit for each injection molding machine as in a prior art technique. Only one set of an image acquisition unit, a molded article identification unit, and a molded article sorting unit has to be provided for the plurality of injection molding machines that constitutes an injection molding system. Therefore, it is possible to pack molded articles in boxes or align them inexpensively as compared with a case in which molded articles are packed in boxes or aligned in each injection molding machine. Molded articles produced by the plurality of injection molding machines are aggregated in one place and packed in boxes or aligned, and can therefore be moved efficiently to a process such as packaging or assembly next to the box packing or alignment. Moreover, it is possible to narrow down candidate images in processing in the molded article identification unit, thereby reducing a load in processing in the molded article identification unit.

An injection molding system according to a second embodiment of the present invention will next be described with reference to FIGS. 3 and 4.

The injection molding system of the second embodiment differs from the injection molding system of the first embodiment described above in that the carrier 20 includes first carriers 22 (connected to the injection molding machines) and a second carrier 24 (common to the plurality of injection molding machines).

Figure 3:
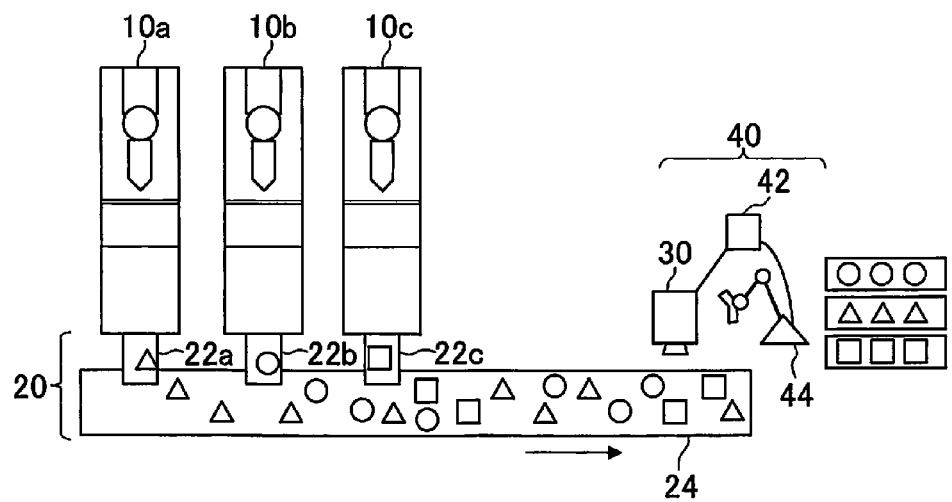
FIG. 3 is a configuration diagram of an injection molding system according to a second embodiment of the present invention.

As illustrated in FIG. 3, molded articles produced by the injection molding machines 10a, 10b, and 10c are temporarily carried out of the injection molding machines 10a, 10b, and 10c by the first carriers 22a, 22b, and 22c, and then carried by the second carrier 24 common to these (three) injection molding machine 10a, 10b, and 10c.

Figure 4:
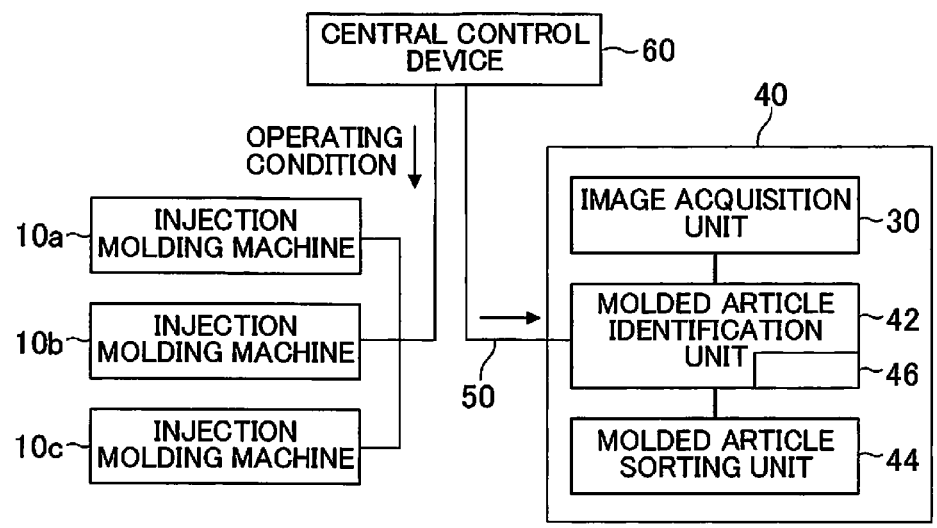
FIG. 4 is a block diagram of the injection molding system in FIG. 3.

As illustrated in FIG. 4, the injection molding machines 10a, 10b, and 10c are connected to a central control device 60 via the communication line 50. The central control device 60 and the molded article identification unit 42 are also connected via the communication line 50. A set of operating conditions for each of the injection molding machines 10 and identifiers of molded article image information is stored in the central control device 60. The central control device 60 sets the operating conditions in the injection molding machines 10a, 10b, and 10c through the communication line 50, and sets the identifiers of the image information associated with the set operating conditions in the molded article identification unit 42 through the communication line 50.

The molded article identification unit 42 includes an image information storage section 46. The image information storage section 46 stores molded article image information in association with identifiers of the image information. When the identifiers of the image information are sent from the central control device 60, the molded article identification unit 42 reads the molded article image information from the image information storage section 46 based on the identifiers, compares the molded article image information with molded article images acquired by the image acquisition unit 30, and decides a destination of sorting of the molded articles. The molded article sorting unit 44 sorts the molded articles based on the destination of sorting of the molded articles decided by the molded article identification unit 42.

In the injection molding system illustrated in FIG. 4, the image information storage section 46 is disposed in the inside of the molded article identification unit 42. However, the image information storage section 46 may be disposed in the outside of the molded article identification unit 42, the image information storage section 46 and the molded article identification unit 42 may be connected, and the molded article identification unit 42 may read molded article image information from the image information storage section 46. In the injection molding system illustrated in FIG. 4, the image acquisition unit 30, the molded article identification unit 42, the molded article sorting unit 44, and the image information storage section 46 constitute the molded article sorting section 40.

Operation of the injection molding system illustrated in FIG. 4 will next be described.

When a type of an molded article to be produced by the injection molding machine 10a, 10b, and 10c is to be changed, the central control device 60 sets operating condition for the injection molding machine 10a, 10b, and 10c through the communication line 50 and transmits identifiers of molded article image information to the molded article identification unit 42 through the communication line 50. The molded article identification unit 42 reads the molded article image information from the image information storage section 46 based on the transmitted identifiers of the molded article image information, and stores the molded article image information in an internal molded article image information storage section (not shown) or the image information storage section 46. Then, when molded articles are carried by the carrier 20, images of the carried molded articles are taken by the image acquisition unit 30, and imaging data is transmitted to the molded article identification unit 42. The molded article identification unit 42 determines types of the carried molded articles based on the molded article image information stored in the internal molded article image information storage section or the image information storage section 46 and the molded article images transmitted from the image acquisition unit 30, and transmits molded article type information to the molded article sorting unit 44. The molded article sorting unit 44 sorts the carried molded articles based on the transmitted molded article type information.

In the injection molding system of the first embodiment, each of the injection molding machines 10a, 10b, and 10c stores molded article image information, the molded article image information is transmitted to the molded article identification unit 42 through the communication line 50, and the molded article image information is compared with molded article images acquired by the image acquisition unit 30.

On the other hand, in the injection molding system of the second embodiment, the central control device 60 is provided, the central control device 60 sets operating conditions for the injection molding machines 10a, 10b, and 10c, and the image information storage section 46 provided in the molded article identification unit 42 stores molded article image information. Then, the molded article image information associated with identifiers of image information transmitted from the central control device 60 is read from the image information storage section 46, and the read image information is compared with molded article images acquired by the image acquisition unit 30.

The features of the first and second embodiments described above may be combined as appropriate. As an example, in the injection molding system illustrated in FIG. 2 (first embodiment), the molded article identification unit 42 may include the image information storage section 46, the image information storage section 46 may store molded article image information, and the injection molding machines 10a, 10b, and 10c may transmit identifiers of image information.

In the injection molding system illustrated in FIG. 4 (second embodiment), the central control device 60 may store molded article image information for the injection molding machines 10a, 10b, and 10c, the molded article image information may be transmitted from the central control device 60 to the molded article identification unit 42 through the communication line 50, and the transmitted molded article image information may be compared with molded article images acquired by the image acquisition unit 30.

The molded article identification unit 42 or the molded article sorting unit 44 may include a counting section (not shown). When the molded article identification unit 42 identifies molded articles or the molded article sorting unit 44 sorts the molded articles and packs the molded articles in boxes or align them, the counting section may count a quantity of the molded articles for each molded article type. A production volume may be set for each molded article type. When the quantity of the molded articles reaches the set production volume for each molded article type, an instruction such as an operation stop instruction, a warning output instruction, or an instruction for displaying a warning message on a screen may be output to the injection molding machine 10 that produces the molded articles. Then, the injection molding machine 10 may stop operation, output a warning, or display a warning message on the screen. Thus, the injection molding machines 10 do not produce a quantity of molded articles more than necessary.

The invention claimed is:

1. An injection molding system comprising:
a plurality of injection molding machines that produce molded articles based on preset operating conditions;
a carrier that carries the molded articles;
a storage section that stores, for each molded article type, a set of the operating conditions for the injection molding machines and image-related information for the molded articles that are associated with the operating conditions and are molded in accordance with the operating conditions; and
a molded article sorting section that sorts the molded articles, the molded article sorting section including
an image acquisition unit that acquires images of the molded articles carried by the carrier,
a molded article identification unit that generates identification information for identifying types of the molded articles carried by the carrier in accordance with the molded article images acquired by the image acquisition unit and the image-related information for the molded articles stored in the storage section, and
a molded article sorting unit that sorts the carried molded articles based on the identification information generated by the molded article identification unit.

2. The injection molding system according to claim 1, wherein
the storage section is disposed in each of the injection molding machines, and the injection molding machine includes a setting section that sets the operating conditions,
the storage section stores, as the image-related information, the image information for the molded articles that are molded in accordance with the operating conditions, and
the image information for the molded articles associated with the operating conditions set by the setting section is set in the molded article identification unit.

3. The injection molding system according to claim 1, further comprising:
a central control device that centrally manages the injection molding machines and the molded article identification unit, wherein
the central control device includes a setting section that sets the operating conditions in one of the injection molding machines,
the storage section is disposed in the central control device, and the storage section stores, as the image-related information, the image information for the molded articles that are molded in accordance with the operating conditions, and
the image information for the molded articles associated with the operating conditions set by the setting section is set in the molded article identification unit.

4. The injection molding system according to claim 1, wherein
the storage section is disposed in each of the injection molding machines, the injection molding machine includes a setting section that sets the operating conditions,
the storage section stores, as the image-related information, identifiers of the molded articles that are molded in accordance with the operating conditions,
the molded article sorting section further includes an image information storage section that stores molded article image information associated with the identifiers, and
the molded articles are identified based on the molded article image information that is stored in the image information storage section and is associated with the identifiers of the molded articles that are molded in accordance with the operating conditions set by the setting section and the molded article images acquired by the image acquisition unit.

5. The injection molding system according to claim 1, further comprising:
a central control device that centrally manages the injection molding machines and the molded article identification unit, wherein
the central control device includes a setting section that sets the operating conditions in one of the injection molding machines,
the storage section is disposed in the central control device, and the storage section stores, as the image-related information, the identifiers of the molded articles that are molded in accordance with the operating conditions, and
the molded article sorting section further includes an image information storage section that stores the molded article image information associated with the identifiers, and the molded articles are identified based on the molded article image information that is stored in the image information storage section and is associated with the identifiers of the molded articles that are molded in accordance with the operating conditions set by the setting section and the molded article images acquired by the image acquisition unit.

6. The injection molding system according to claim 1, wherein
either the molded article identification unit or the molded article sorting unit includes a counting section that counts a quantity of molded articles for each of the types of the sorted molded articles, and
when the quantity of the molded articles counted by the counting section reaches a preset quantity, a preset instruction is output to the injection molding machine that produces the molded articles.

7. The injection molding system according to claim 6, wherein the preset instruction is at least one of an operation stop instruction, a warning output instruction, and an instruction for displaying a warning message on a screen.

* * * * *